United States Patent
Yano (10) Patent No.: US 7,532,361 B2
(45) Date of Patent: May 12, 2009

(54) IMAGE FORMING SYSTEM, APPARATUS, AND METHOD

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 10/247,282

(22) Filed: Sep. 20, 2002

(65) Prior Publication Data

US 2003/0067638 A1      Apr. 10, 2003

(30) Foreign Application Priority Data

Sep. 28, 2001   (JP)   ............................. 2001-301217

(51) Int. Cl.
*G06K 15/00*   (2006.01)
*H04N 1/405*   (2006.01)

(52) U.S. Cl. ..................... 358/3.05; 358/3.03; 358/3.06

(58) Field of Classification Search ................ 358/1.18, 358/1.9, 3.03, 3.05, 3.06, 3.13, 3.14, 3.16, 358/3.17, 3.26, 450, 451, 530, 452; 382/174, 382/285, 289

See application file for complete search history.

(56) References Cited

U.S. PATENT DOCUMENTS

| | | | | |
|---|---|---|---|---|
| 5,436,738 A | * | 7/1995 | Manico | 358/503 |
| 5,963,664 A | * | 10/1999 | Kumar et al. | 382/154 |
| 6,133,943 A | * | 10/2000 | Needham | 348/37 |
| 6,203,133 B1 | * | 3/2001 | Tanaka et al. | 347/15 |
| 6,304,284 B1 | * | 10/2001 | Dunton et al. | 348/36 |
| 6,335,754 B1 | * | 1/2002 | Endo et al. | 348/37 |
| 6,377,294 B2 | * | 4/2002 | Toyofuku et al. | 348/36 |
| 6,389,179 B1 | * | 5/2002 | Katayama et al. | 382/284 |
| 6,396,960 B1 | * | 5/2002 | Yoshimura | 382/284 |
| 6,771,304 B1 | * | 8/2004 | Mancuso et al. | 348/39 |

FOREIGN PATENT DOCUMENTS

| | | |
|---|---|---|
| JP | 7-38766 | 2/1995 |
| JP | 8-142411 | 6/1996 |

(Continued)

OTHER PUBLICATIONS

U.S. Appl. No. 10/265,791, filed Oct. 8, 2002.

(Continued)

*Primary Examiner*—James A. Thompson
(74) *Attorney, Agent, or Firm*—Fitzpatrick, Cella, Harper & Scinto (57) ABSTRACT

When a three-dimensional image viewed stereoscopically by superposition of a lenticular sheet is merely binarized and output, fringes are produced in the direction in which cylindrical lens elements repeat on the lenticular sheet, and therefore an appropriate stereoscopic image is not observed. Accordingly, a multiple viewpoint image sequence of the image of a subject is acquired, a three-dimensional stripe image is synthesized by the images of the image sequence, the stripe image is converted to a multivalued image by reducing the number of tones by the error diffusion method, the multivalued image is convened to a binary dot pattern by the density pattern method, and the dot pattern is formed on a recording medium. Any dot pattern of a prescribed plurality of dot patterns is selected in accordance with a pixel position in a direction perpendicular to the direction in which cylindrical lens elements repeat on the lenticular sheet, thereby obtaining a high-quality stereoscopic image in which the occurrence of fringes is reduced.

10 Claims, 5 Drawing Sheets

FOREIGN PATENT DOCUMENTS

JP          9-102968          4/1997

OTHER PUBLICATIONS

U.S. Appl. No. 09/087,506, filed May 29, 1998.
Takanori Okoshi, "Three-dimensional Imaging Techniques", pp. 1 to 403 (1976).

Dr. Johji Tajima, "Development and Standardization of a Spectral Characteristics Data Base for Evaluating Color Reproduction in Image Input Devices", pp. 42 to 50 (May, 1998).

Dr. Johji Tajima, "Color Image Reproduction Theory", pp. 97-102, Maruzen, 1996.

* cited by examiner

|  |  | * | w 1 |
|---|---|---|---|
| w 2 | w 3 | w 4 | w 5 |

FIG. 4

FIG. 5

IMAGE FORMING SYSTEM, APPARATUS, AND METHOD

FIELD OF THE INVENTION

This invention relates an image forming system, apparatus and method that make it possible to observe a stereoscopic image by superposing a lenticular sheet or the like on an image formed by an image forming apparatus.

BACKGROUND OF THE INVENTION

Integral photography and lenticular three-dimensional image schemes (see Takanori Okoshi, "Three-Dimensional Imaging Techniques", Academic Press, 1976) are known as methods of forming a stereoscopic image. However, such methods of forming a stereoscopic image rely upon photographic methods. For example, a lenticular three-dimensional image is obtained by acquiring images that are the result of photographing a subject from a number of viewpoints and printing these images on a single photographic plate via a lenticular sheet, which has extremely small semicircular cylindrical convex lenses (cylindrical lens elements) disposed in parallel on one side thereof. However, this method involves problems A to C below.

A. Since images from a number of viewpoints of the subject are necessary, elaborate photographic equipment such as a multiocular camera is required.

B. Likewise, elaborate printing equipment is necessary for forming the stereoscopic image.

C. Photography and printing require adjustments and experience even if the above equipment is used.

In view of the aforementioned problems, various proposals utilizing digital photographic techniques have been made in recent years to achieve the formation of stereoscopic images through a simple arrangement.

For example, the present applicant has proposed a system in which stereoscopic photography is simplified by mounting a stereoscopic photograph adapter on a digital camera, generating a multiple viewpoint image sequence from a captured stereo image and printing a three-dimensional image, and observing this image through a lenticular sheet, thereby simplifying the formation of the stereoscopic image. Further, the structure of the optical member, thereby converting the multivalued image to a binary dot pattern.

The present applicant has further proposed a technique in which a video signal exhibiting multiple parallax is converted to a binary video signal by an error diffusion processing circuit, whereby it becomes possible to output the image to a binary printer, as illustrated in the specification of Japanese Patent Application Laid-Open No. 9-102968. However, a three-dimensional image generated from a multiple viewpoint image sequence requires much more image data than an ordinary image. If a binary image conversion based upon the error diffusion method is applied to such a multivalued image, processing time is prolonged.

The present applicant has further proposed a technique in which when a multivalued image is converted to a binary image, the error diffusion method and a density pattern method are used conjointly to achieve both the high tonal representation of the error diffusion method and the high processing speed of the density pattern method, as illustrated in the specification of Japanese Patent Application Laid-Open No. 7-38766. The present applicant has further proposed a technique in which a plurality of density patterns are prepared and used by being switched among selectively, thereby making it possible to obtain a greater improvement in image quality, as illustrated in the specification of Japanese Patent Application Laid-Open No. 8-142411. If these techniques are applied to the binarization of a three-dimensional image, both high image quality and high processing speed can be achieved.

However, if the above-described error diffusion method or density pattern method is simply applied to processing for binarizing a three-dimensional image in the prior art, a problem arises.

Specifically, fringes corresponding to a difference frequency $|n \cdot fP - m \cdot fL|$ (where n,m are positive integers) that is a whole-number multiple of the difference between spatial frequencies are produced in the direction in which the cylindrical lens elements are arranged, where fL represents the spatial frequency corresponding to the pitch at which the cylindrical lens elements of the lenticular sheet repeat, and fP represents the spatial frequency corresponding to the direction in which the cylindrical lens elements of the lenticular sheet repeat (this direction shall be referred to as the "cylindrical-lens array direction" below).

The smaller n, m are, the greater the contrast of the fringes. Since fP>fL holds, it is preferred that fP be as closed to fL as possible. That is, the contrast of the fringes increases and the fringes become more noticeable if the spatial frequency corresponding to the cylindrical-lens array direction in the black-and-white density pattern of the printer is low. In order to reduce the occurrence of fringes, therefore, it is required that the black-and-white density pattern of the printer be controlled taking into account the cylindrical-lens array direction.

SUMMARY OF THE INVENTION

The present invention has been proposed to solve the problems of the prior art and has as its object to provide an image forming system, apparatus and method, whereby stereoscopic vision is made possible by superposing an optical member such as a lenticular sheet on a formed image output by an image forming apparatus that provides a binary output.

Another object of the invention is to reduce fringes produced when the optical member is superposed, whereby a high-quality stereoscopic image is obtained.

Another object of the invention is to provide an image forming system in which an animation of a subject can be observed based upon a time-series image sequence of the subject.

According to the present invention, the foregoing objects are attained by providing an image forming system for observing a subject image, which has been formed on a recording medium, by superposing an optical member, which has a one-dimensional periodic structure, on the subject image, comprising: image acquisition means for acquiring an image sequence of the subject image; image synthesizing means for synthesizing a stripe image in such a manner that pixels having identical coordinates in each image of the image sequence will be arranged as adjacent pixels; error diffusion quantization means for converting the stripe image to a multivalued image by reducing the number of tones by the error diffusion method; binarization means for converting the multivalued image to a binary dot pattern by the density pattern method; and image forming means for forming the binary dot pattern on a recording medium; wherein the binarization means selects any dot pattern of a prescribed plurality of dot patterns in accordance with a pixel position, in the multivalued image, in a direction perpendicular to direction of repetition of the periodic perpendicular to the cylindrical lens away direction in accordance with the direction in which the cylindrical lens elements of the lenticular sheet repeat (the cylindrical-lens array direction) with respect to the image direction at the time of viewing. Generally, when a stereoscopic image is viewed, left and right images are viewed separately in the horizontal direction of the images and therefore the cylindrical-lens array direction is the horizontal direction. Accordingly, in this embodiment, it is so arranged that the density patterns are changed over sequentially in accordance with the position of the image in the vertical direction.

For example, the binarization means switches among the plurality of dot patterns sequentially in accordance with a pixel position, in the multivalued image, in a direction perpendicular to direction of repetition of the periodic structure of the optical member.

By way of example, the optical member is a lenticular sheet.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

First Embodiment

Figure 2:
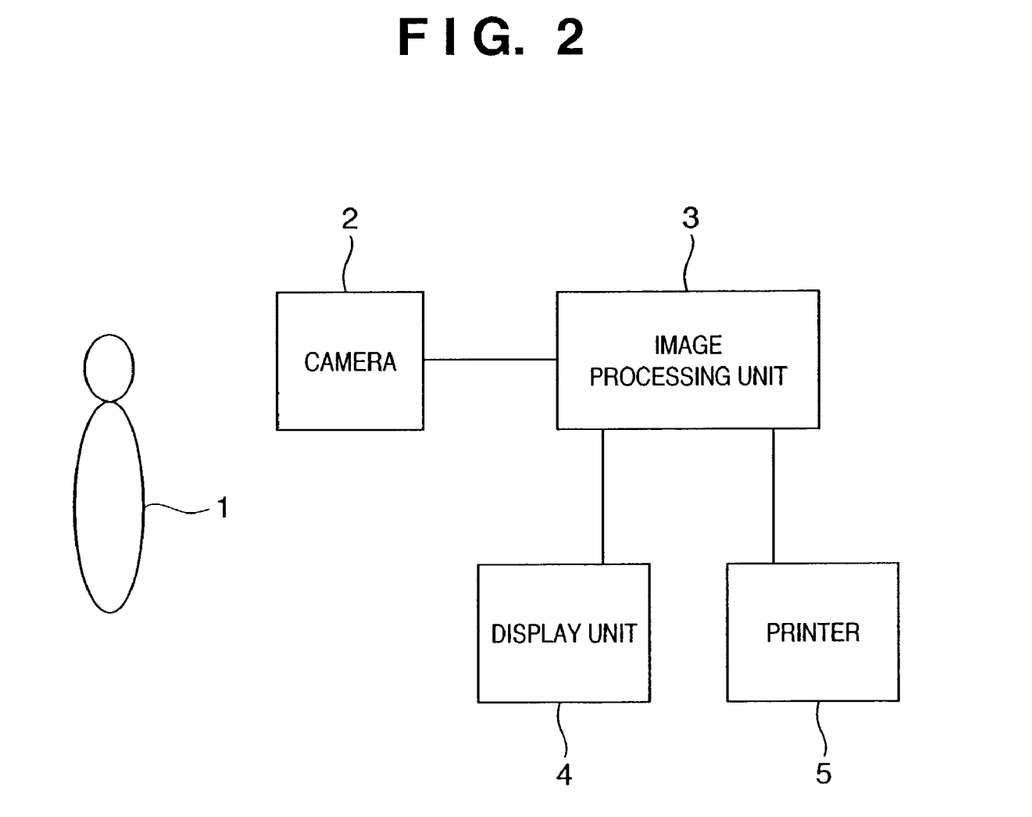
FIG. 2 is a block diagram illustrating the configuration of the system for forming a stereoscopic image according to the first embodiment.

FIG. 2 is a block diagram illustrating the configuration of the system for forming a stereoscopic image according to a first embodiment of the invention.

As shown in FIG. 2, the system includes a camera 2 for photographing a subject 1. An example of the camera 2 used is the PowerShot S20, a digital camera manufactured by Canon, Inc. The system further includes an image processing unit 3 constituted by, e.g., a general-purpose personal computer; a display unit 4, such as a CRT display, connected to the image processing unit 3 for displaying an image, which is to be processed in the image processing unit 3, as well as processed information; and a printer 5, such as the BJF 850 manufactured by Canon, Inc., connected to the image processing unit 3 for printing image data and the like generated by the image processing unit 3. The connection between the image processing unit 3 and the camera 2 and printer 5 is implemented by a USB (Universal Serial Bus) or the like.

Photography is performed upon mounting the camera 2 upon a horizontally slidable base. A number N of images in a multiple viewpoint image sequence is decided in such a manner that N=RP×RL will hold, where RL represents the pitch (in inches) of cylindrical lens elements of a lenticular sheet and RP represents the minimum pitch (resolution) (in dpi) at which the printer can express a grayscale color image. Since N is an integer, in actuality an integer close to RP×RL is adopted as the number N of images. For example, if the resolution of the printer is 600 dpi and the cylindrical lens elements of the lenticular sheet have a pitch of $\frac{1}{50.8}$ inches, then it is preferred that N=12 images hold. Each image is captured while deciding the amount of movement of the viewpoints depending upon the size of the subject 1, the photographic conditions and the size of the image to be printed and shifting the camera 2 at equal intervals in the horizontal direction. The captured images (multiple viewpoint image) are recorded on a compact flash card or the like in, e.g., the JPEG format.

Next, the multiple viewpoint image thus captured is loaded in the image processing unit 3. By way of example, image data that has been recorded by the camera 2 is recorded temporarily as image data on a hard disk within the personal computer via a USB interface by performing a prescribed operation upon launching driver software for the camera 2 in the personal computer, which serves as the image processing unit 3. If the image processing unit 3 has a PC card slot, the camera 2 and the image processing unit 3 need not be connected to each other. Specifically, the compact flash card is removed temporarily from the camera 2, the card is inserted into a compact flash card adapter that can be removably inserted into the PC card slot, and the adapter is then inserted into the PC card slot of the image processing unit 3, whereby the image data that has been recorded on the compact flash card can be handled in a manner similar to that of image data recorded on the hard disk of the personal computer.

The image processing unit 3 synthesizes a three-dimensional stripe image with respect to the multiple viewpoint image thus loaded and outputs the result to the printer 5. This series of processes is executed as application software of the personal computer. The content of a program run by the image processing unit 3 to print a three-dimensional image will now be described.

Figure 1:
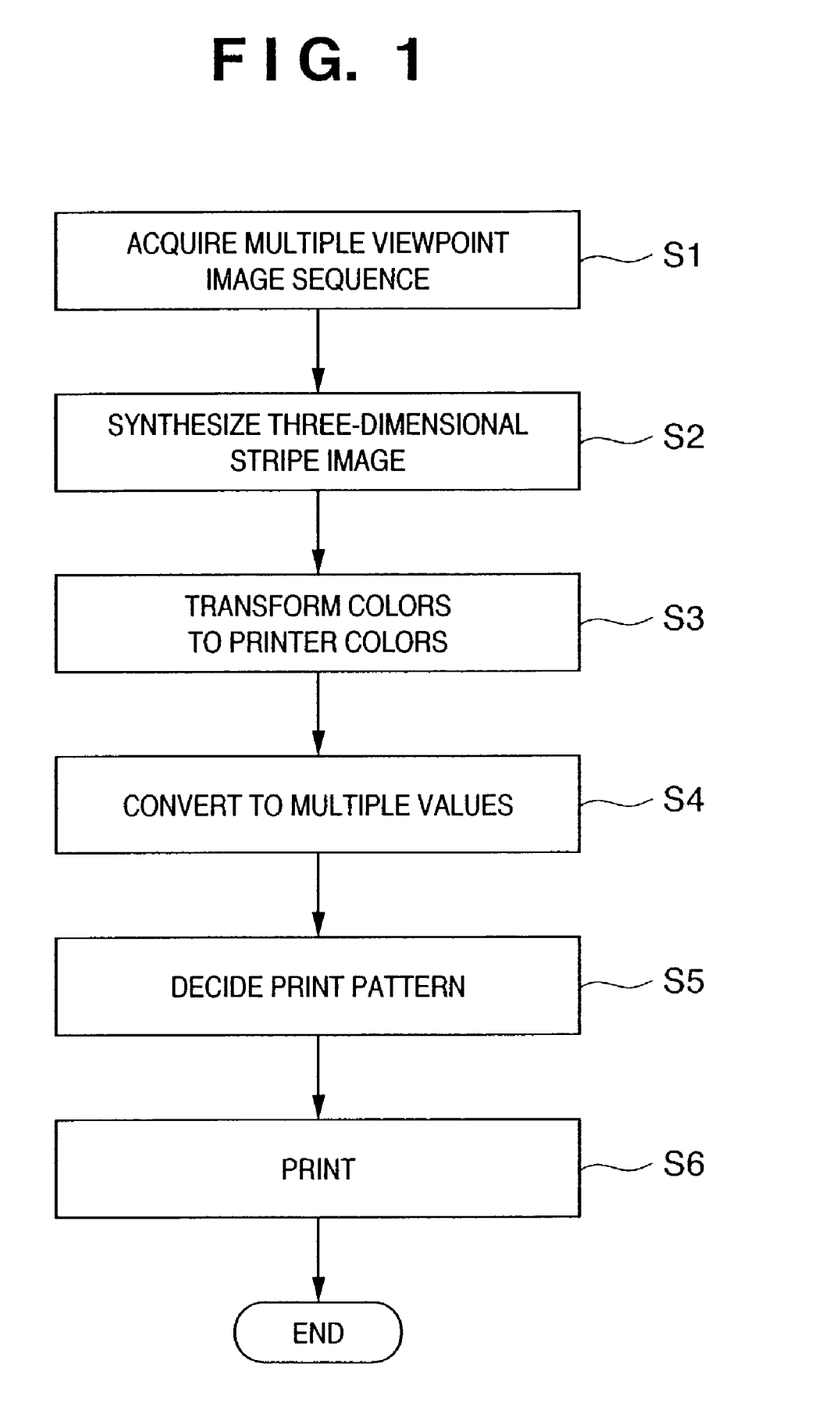
FIG. 1 is a flowchart illustrating a processing algorithm in a system for forming a stereoscopic image according to a first embodiment of the present invention.

FIG. 1 is a flowchart illustrating an algorithm of a processing program for printing a three-dimensional image in the stereoscopic image forming system of the first embodiment.

First, at step S1 in FIG. 1, each image that is captured is loaded in a memory of the personal computer, namely the image processing unit 3, in order to form the images into data that can be handled by the processing program, and then the image data is converted in such a manner that processing for synthesizing the three-dimensional stripe image can be executed at step S2, described later.

At this time the file of the multiple viewpoint image to be processed is specified by using input means such as a keyboard (not shown), and the specified file is read in by the program. The image data is converted to two-dimensionally arrayed data or to a bitmap in the three channels of R, G, B. In particular, if the input image data has the JPEG format, it is necessary to execute a data conversion such as processing for decompressing JPEG images.

If images that have been loaded in the image processing unit 3 are utilized directly as a multiple viewpoint image sequence, rectangular areas of the same prescribed size are cut from respective ones of the images of the image sequence at positions to which the respective images are shifted a predetermined amount in such a manner that the parallax of the main subject, for which the best image quality is desired at viewing time, will be reduced to zero. The reason for this is that parallax will be zero with respect to an infinitely far subject. The processing for cutting out the rectangular areas may be executed using the display unit 4. The image size of each image constituting the three-dimensional stripe image described later is found based upon resolution and size at the time of printing, and the rectangular areas that have been cut from the respective images of the image sequence are scaled. In particular, since synthesizing processing in the horizontal direction is executed as post-processing, compression in the horizontal direction is carried out.

By way of example, the size of a printed image is X (=RP× XP)×Y (=RP×YP) pixels, where the resolution of the printer 5 is RP dpi and the print size is XP×YP inches. Accordingly, if the number of images in the sequence is N, then the size of the image at each viewpoint will be H (=X/N)×V (=Y). In actuality, the print size is decided in such a manner that H and V become integers. For example, if H is 200 pixels and V is 1800 pixels, then X will be 2400 pixels and Y will be 1800 pixels. If printing is performed at a resolution of 600 dpi, then the print size will 4×3 inches. Since it is necessary to match the pitch of the cylindrical lens elements of the lenticular sheet and the period of the images, the actual size will differ somewhat but the size is dealt with at the next step S2.

A three-dimensional stripe image is synthesized from the multiple viewpoint image at step S2. The three-dimensional stripe image is synthesized in such a manner that pixels having identical coordinates in each image of the multiple viewpoint image sequence will be arrayed as adjacent pixels in accordance with the array of viewpoints of the images. If the pixel value of a j-th viewpoint is represented by Pjmn (where m, n are the indices of a pixel array in the horizontal and vertical directions, respectively), j-th image data is represented as the following two-dimensional array:

$$
\begin{array}{cccc}
Pj00 & Pj10 & Pj20 & Pj30 \ldots \\
Pj01 & Pj11 & Pj21 & Pj31 \ldots \\
Pj02 & Pj11 & Pj21 & Pj32 \ldots \\
\end{array}
$$

The images of respective ones of the viewpoints are disassociated into strips line by line in the vertical direction and are combined, in a number equivalent to the number of viewpoints, in an order that is the reverse of the order of the viewpoint positions. Accordingly, the image after combination becomes a stripe image of the pixel array indicated below, where viewpoint j=1 indicates an image on the left side and j=N an image on the right side.

PN00 . . . P200P100 PN10 . . . P210P100 PN20 . . . P220 P120 . . .

PN01 . . . P201P101 PN11 . . . P211P111 PN21 . . . P221 P121 . . .

PN02 . . . P202P102 PN12 . . . P212P112 PN22 . . . P222 P122 . . .

The reason for reversing the array order of the viewpoint positions is that images are observed in left-right reversal within one pitch of the cylindrical lens elements when observation is made using the lenticular sheet. This three-dimensional stripe image has a size of X(=N×H)×V if the original multiple viewpoint image is an N-viewpoint image of size H×V.

Next, it is necessary to match the lenticular sheet and pitch in this three-dimensional stripe image. Since pixels of RP dpi are N in number in one pitch, one pitch is N/RP inches. However, since the pitch of the cylindrical lens elements of the lenticular sheet is RL inches, the pitches are made to match by multiplying the image by RL×RP/N in the horizontal direction.

In this embodiment, image data for printing is generated by subjecting the three-dimensional stripe image to the above-mentioned scaling processing in the horizontal and vertical directions. It will suffice to perform bilinear interpolation or the like as the scaling processing.

Next, at step S3, a color transformation is performed in such a manner that image data of each of the R, G, B components of the synthesized three-dimensional stripe image is made to conform to the color components of each of the inks used by the printer.

For example, in a case where printing is performed using inks of the four colors yellow (Y), magenta (M), cyan (C) and black (K), the transformation from the RGB to the YMCK color components is carried out using a look-up table (LUT). (With regard to a color transformation using a LUT, see Joji Tajima: "Color Image Reproduction Theory", pp. 97-102, Maruzen, 1996.) Further, instead of performing the transformation using a LUT, it is permissible to perform the transformation using the following transformation equations:

$$Y0 = -\alpha y \cdot \log(B)$$

$$M0 = -\alpha m \cdot \log(G)$$

$$C0 = -\alpha c \cdot \log(R)$$

$$K0 = MIN(Y0, M0, C0)$$

$$Y = Ayy \cdot Y0 + Aym \cdot M0 + Ayc \cdot C0 + Ayk \cdot K0$$

$$M = Amy \cdot Y0 + Amm \cdot M0 + Amc \cdot C0 + Amk \cdot K0$$

$$C = Acy \cdot Y0 + Acm \cdot M0 + Acc \cdot C0 + Ack \cdot K0$$

$$K = Aky \cdot Y0 + Akm \cdot M0 + Akc \cdot C0 + Akk \cdot K0$$

where MIN ( ) represents the minimum value and $\alpha a$ (a=y,m,c), Aab (a=y,m,c,k; b=y,m,c,k) are correction constants. Further, in a case where printing is performed using inks of the six colors yellow (Y), magenta (M), cyan (C), black (K), light magenta (m) and light cyan (c), the transformation from the RGB to the YMCKmc color components is carried out using a look-up table (LUT).

Next, at step S4, the grayscale image of each of the color components is converted to multivalued image data by the error diffusion method.

First, error components assigned from already processed pixels and noise components are added to each grayscale pixel value of the image data of each of the color components. The grayscale pixel value obtained from addition is then quantized to predetermined multivalue levels by predetermined threshold values. For example, in order to quantize 256 grayscale tones to five levels, a comparison with four threshold values is made to decide multivalue levels with respect to a grayscale pixel value. Quantization error between the grayscale pixel value after addition and the multivalue level decided is then distributed to nearby pixels in accordance with a predetermined weighting.

Figure 3:
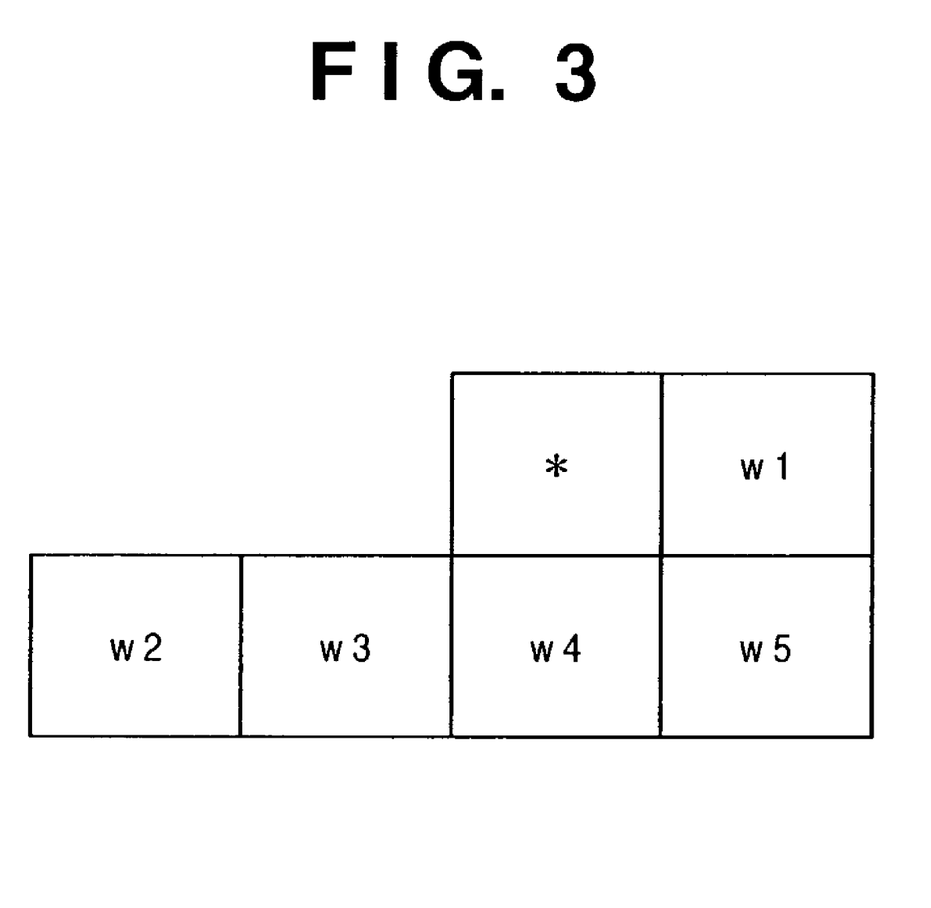
FIG. 3 is a diagram useful in describing error diffusion processing.

FIG. 3 illustrates an example of weighting in error diffusion. In FIG. 3, the pixel indicated by "*" is a pixel of interest, and quantization error of the pixel of interest is distributed to other pixels assigned weights of w1 to w5. For example, let g represent the grayscale pixel value of the pixel of interest before quantization, and let G represent a multivalue level of the pixel of interest after quantization. Then, an error equivalent to $w1 \times (g-G)$ is assigned to the pixel to the right of the pixel of interest, and an error equivalent to $w4 \times (g-G)$ is assigned to the pixel below the pixel of interest. Here $w1+w2+w3+w4+w5=1$.

The above-described error diffusion method is applied successively to each of the color components for all pixels in a prescribed direction. If the optimum value is selected as the noise component or error-assignment weighting in error diffusion processing in accordance with the pixel value of the pixel of interest, then a multivalued image of higher image quality will be obtained.

Figure 4:
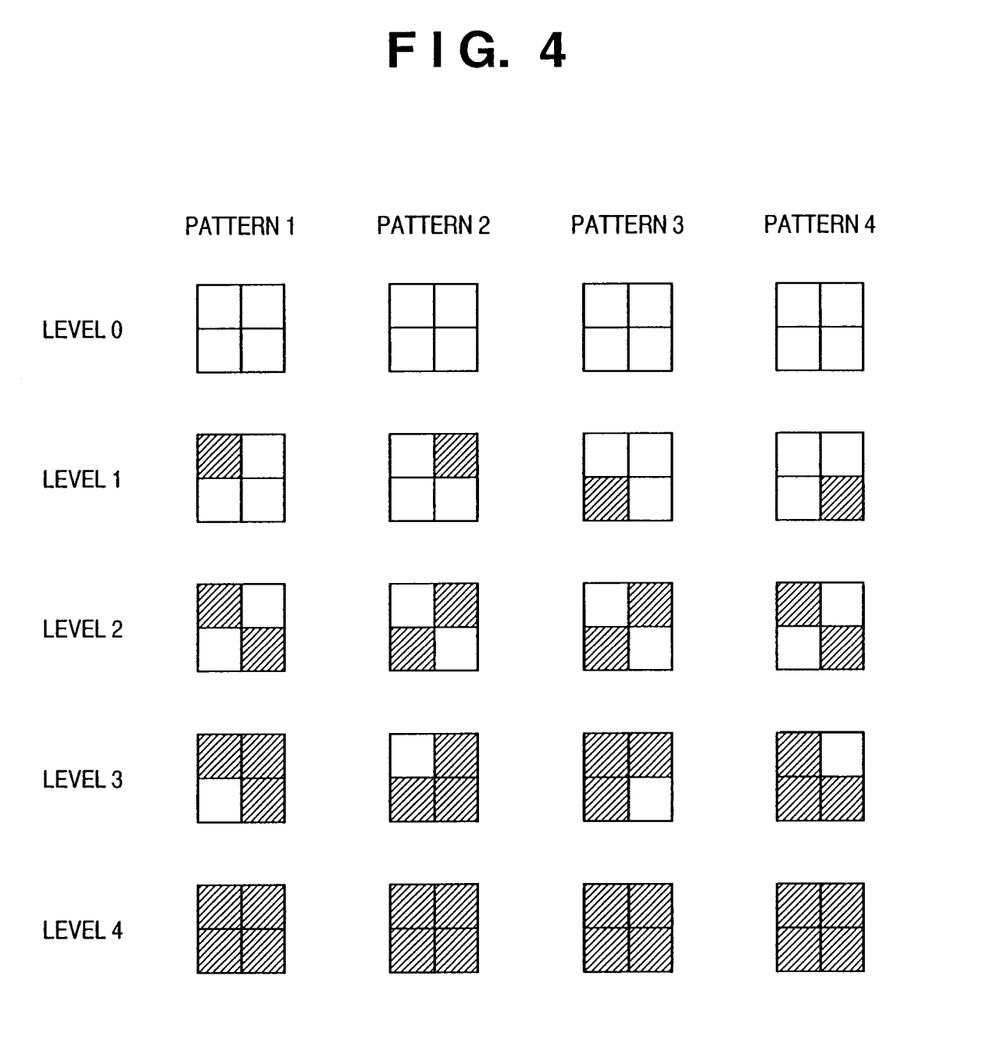
FIG. 4 is a diagram illustrating examples of density patterns for each of pixel levels.

Next, at step S5, a print pattern is decided by the density pattern method for the multivalued image of each of the color components after quantization. FIG. 4 is a diagram illustrating examples of density patterns in accordance with multivalue levels. With regard to a multivalued image that has been quantized to five levels, patterns of each level are represented by a 2×2 pixel matrix of monochrome binary value. In this example, each level has four patterns. (However, identical patterns repeat in terms of pattern representation with regard to levels 0, 2 and 4.) In FIG. 4, pixels indicated in white are pixels (white dots) where ink is not printed, while pixels indicated in black are pixels (black dots) where ink is printed. Further, the patterns of level 0 are patterns that correspond to the level of maximum brightness.

At step S5, one of a plurality of the patterns shown in FIG. 4 is selected in accordance with each level with regard to each pixel of the multivalued image after quantization, and the pattern is binarized as a 2×2 matrix. The density patterns selected from the plurality of patterns are changed over (switched) sequentially along a direction present applicant has proposed a system in which the area of a subject is acquired from a single subject image, a multiple viewpoint image sequence of the subject from a plurality of viewpoints is generated by deforming the subject image using the subject area, and a stereoscopic image is formed. In these proposals, however, no particular mention is made of specific processing for a case where a binary printer that performs binary tone control is used as the output means when printing is actually carried out.

By virtue of the above processing, there is obtained a binary image in which the number of pixels in each of the horizontal and vertical directions is twice that of the original multivalued image. This binarization based upon the density pattern method is applied to the images of each of the color components. Using the optimum density pattern for each color component at this time provides a binary image having better image quality.

Figure 5:
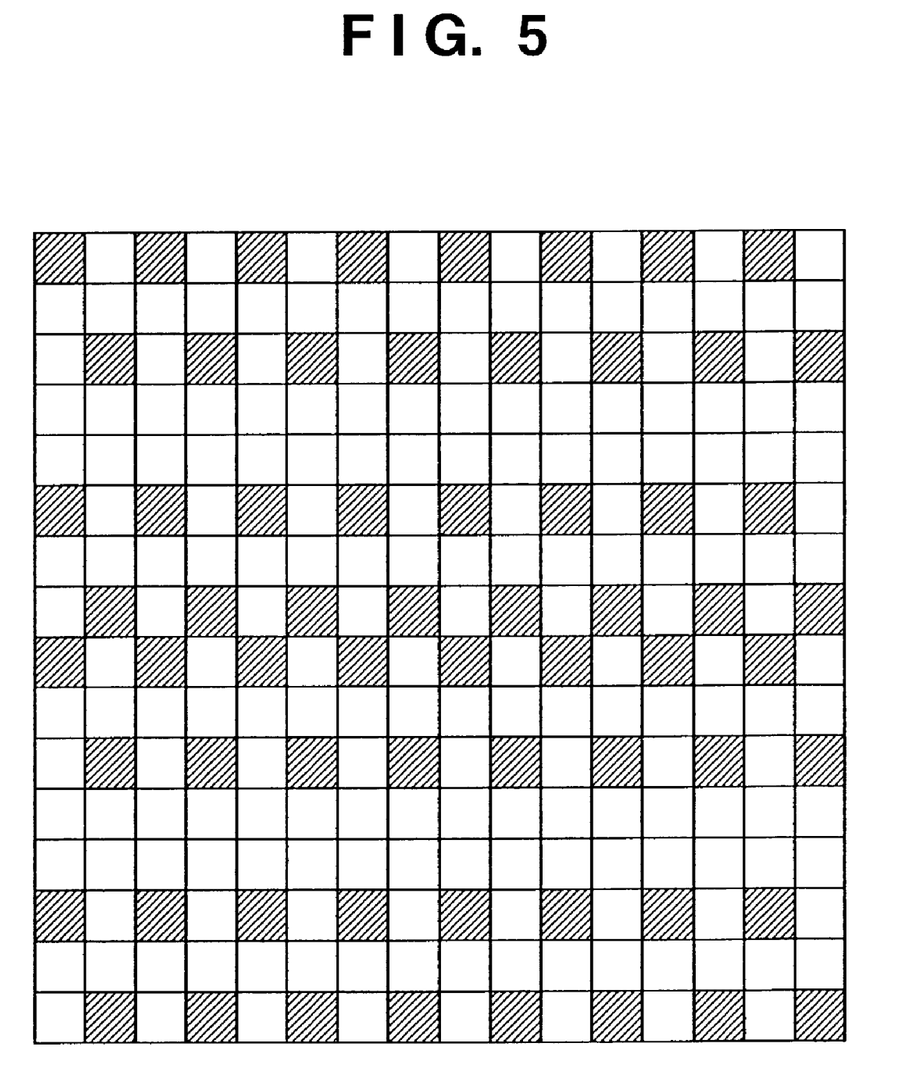
FIG. 5 is a diagram illustrating an example of the dot pattern of a binary image obtained with regard to an area of pixel level 1.

In a typical case where fringes are produced when an image is superposed on a lenticular sheet, there are instances where a pixel value in the image does not change and the quantization level thereof is 1 or 3. In this embodiment, however, the pattern of a binary image obtained by the above-described binarization becomes as shown in FIG. 5 if one imagines a multivalued image area in which the pixels for which the level is one after quantization are spread out uniformly. In accordance with FIG. 5, the period of the dot patterns in the horizontal direction is two dots and the period of the dot patterns in the vertical direction is eight dots. Accordingly, in a case where a lenticular sheet is placed with the cylindrical-lens array direction disposed horizontally in this embodiment, pitch in the horizontal direction is held low in the dot patterns and therefore the occurrence of fringes can be reduced.

Next, at step S6, the binary image generated at step S5 is printed. More specifically, the printer (printer 5) is controlled in such a manner that ink is printed for pixels corresponding to black dots in the binary image.

In accordance with this embodiment, as described above, a stereoscopic image of a subject can be observed by superposing an optical member such as a lenticular sheet on a binary image printed by the image output unit 5 by the processing of steps S1 to S6 set forth above. Further, fringes produced at the time of observation can be reduced to obtain a stereoscopic image of high image quality.

In this embodiment, a case is described in which a multiple viewpoint image sequence for obtaining a stereoscopic image is captured while shifting the camera at equal intervals in the horizontal direction. However, in a system in which a stereoscopic photographic adapter is mounted on a digital camera to shoot a stereoscopic image, such as in the example of the prior art described above, an arrangement may be adopted in which a parallax map representing a subject in the depth direction is extracted from the captured stereoscopic image, and a multiple viewpoint image sequence of the subject from a plurality of viewpoints is generated from the stereoscopic image and parallax map. Similarly, as described above in the foregoing example of the prior art, an arrangement may be adopted in which the area of a subject is acquired from a single subject image, a parallax map representing the distribution of the subject in the depth direction is extracted from the image area, and a multiple viewpoint image sequence of the subject from a plurality of viewpoints is generated from the stereoscopic image and parallax map.

Further, in this embodiment, a stereoscopic photograph printing system using a lenticular three-dimensional image technique has been described. However, the present invention is applicable also to a stereoscopic photograph printing system using a barrier technique. In a case where the barrier technique is employed, it will suffice to generate a binary image while changing over a plurality of density patterns in accordance with the position of a pixel in the direction perpendicular to the repetition direction of the barrier.

Further, this embodiment has been described with regard to a system for forming a lenticular stereoscopic image. However, rather than employing a sequence of multiple viewpoint images, images at multiple points in time may be selected from a moving image captured by a video camcorder or the like, and a sequence of time-series images may be acquired and input to the processing program of the above-mentioned personal computer. In this case, an animation of the subject can be viewed by superposing a lenticular sheet on the printed image. In the case of a moving image, using both the left and right eyes to view the same image makes the image easier to see, and therefore the repetition direction of the cylindrical lens element of the lenticular sheet is made vertical in such a manner that separate images can be observed when the viewing position is shifted in the vertical direction of the image. In this case, therefore, changeover of the density patterns at step S5 in FIG. 1 need only be performed along the positions of the images in the horizontal direction.

Other Embodiments

The present invention can be applied to a system constituted by a plurality of devices (e.g., a host computer, interface, reader, printer, etc.) or to an apparatus comprising a single device (e.g., a stereoscopic image printer, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire actual processing based upon the designation of program codes and implements the functions of the embodiments by this processing.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire actual processing based upon the designation of program codes and implements the functions of the above embodiments by this processing.

Thus, in accordance with the present invention, as described above, stereoscopic vision is made possible by superposing an optical member such as a lenticular sheet on an image output by an image forming apparatus that provides a binary output.

Further, fringes produced when the optical member is superposed are reduced, whereby a high-quality stereoscopic image is obtained.

Further, animation of a subject can be observed by applying the present invention to a time-series image sequence.

The present invention is not limited to the above embodiments and various changes and modifications can be made within the spirit and scope of the present invention. Therefore, to apprise the public of the scope of the present invention, the following claims are made.

What is claimed is:

1. An image forming system for forming a subject image, which has been formed on a recording medium, and which is observed by superposing an optical member which has a one-dimensional periodic structure, comprising:
    image acquisition means for acquiring an image sequence of the subject image;
    image synthesizing means for synthesizing a stripe image in such a manner that pixels having identical coordinates in each image of the image sequence will be arrayed as adjacent pixels;
    error diffusion quantization means for converting the stripe image to a multivalued image by reducing a number of tones through the error diffusion method;
    binarization means for converting the multivalued image to a binary dot pattern through a density pattern method; and
    image forming means for forming the binary dot pattern on a recording medium,
    wherein said binarization means switches among the plurality of dot patterns, which are the same level as each other, sequentially in accordance with a pixel position, in the multivalued image, in a direction perpendicular to a direction of repetition of the periodic structure of the optical member, so as to, when the optical member is superimposed, reduce occurrence of fringes by shortening a period of a binary dot pattern in the direction of repetition of the periodic structure from a period of a binary dot pattern in the direction perpendicular to the direction of repetition of the periodic structure, thereby converting the multivalued image to a binary dot pattern.

2. The system according to claim 1, wherein the optical member is a lenticular sheet.

3. The system according to claim 1, wherein said image acquisition means:
    acquires the subject image from multiple viewpoints as the image sequence; and
    enables observation of a stereoscopic image of a subject by superposing the optical member on an image formed by said image forming means.

4. The system according to claim 3, wherein said image acquisition means:
    acquires the subject image from multiple viewpoints as the image sequence by moving a camera while the camera photographs the subject;
    cuts an area of a predetermined size from each image of the image sequence so as to eliminate parallax of a main subject; and
    scales each cut area in accordance with the size of the image formed by said image forming means.

5. The system according to claim 3, wherein said image acquisition means:
    captures the stereoscopic image of the subject from two different viewpoints;
    extracts a parallax map representing a distribution of the subject in the depth direction thereof; and
    generates a multiple viewpoint image sequence from multiple viewpoints of the subject based upon the stereoscopic image and the parallax map.

6. The system according to claim 3, wherein said image acquisition means:
    acquires a subject area from a single subject image;
    extracts a parallax map representing a distribution of the subject in the depth direction thereof; and
    generates a multiple viewpoint image sequence from multiple viewpoints of the subject based upon the stereoscopic image and the parallax map.

7. The system according to claim 1, wherein said image acquisition means:
    acquires a time-series image sequence by selecting images from a moving image at multiple points in time; and
    enables observation of an animation of a subject by superposing the optical member on an image formed by said image forming means.

8. An image forming method for forming a subject image, which has been formed on a recording medium, and which is observed by superposing an optical member which has a one-dimensional periodic structure, comprising:
    an image acquisition step of acquiring an image sequence of the subject image;
    an image synthesizing step of synthesizing a stripe image in such a manner that pixels having identical coordinates in each image of the image sequence will be arrayed as adjacent pixels;
    an error diffusion quantization step of converting the stripe image to a multivalued image by reducing a number of tones through the error diffusion method;

a binarization step of converting the multivalued image to a binary dot pattern through a density pattern method; and an image forming step of forming the binary dot pattern on a recording medium, wherein said binarization step switches among the plurality of dot patterns, which are the same level as each other, sequentially in accordance with a pixel position, in the multivalued image, in a direction perpendicular to a direction of repetition of the periodic structure of the optical member, so as to, when the optical member is superimposed, reduce occurrence of fringes by shortening a period of a binary dot pattern in the direction of repetition of the periodic structure from a period of a binary dot pattern in the direction perpendicular to the direction of repetition of the periodic structure, thereby converting the multivalued image to a binary dot pattern.

9. The method according to claim 8, wherein the optical member is a lenticular sheet.

10. A computer-executable program embodied in a computer-readable medium for implementing an image forming method for forming a subject image, which has been formed on a recording medium, and which is observed by superposing an optical member, which has a one-dimensional periodic structure, comprising:

an image acquisition step of acquiring an image sequence of the subject image;

an image synthesizing step of synthesizing a stripe image in such a manner that pixels having identical coordinates in each image of the image sequence will be arrayed as adjacent pixels;

an error diffusion quantization step of converting the stripe image to a multivalued image by reducing a number of tones through the error diffusion method;

a binarization step of converting the multivalued image to a binary dot pattern through a density pattern method; and an image forming step of forming the binary dot pattern on a recording medium, wherein said binarization step switches among the plurality of dot patterns, which are the same level as each other, sequentially in accordance with a pixel position, in the multivalued image, in a direction perpendicular to a direction of repetition of the periodic structure of the optical member, so as to, when the optical member is superimposed, reduce occurrence of fringes by shortening a period of a binary dot pattern in the direction of repetition of the periodic structure from a period of a binary dot pattern in the direction perpendicular to the direction of repetition of the periodic structure, thereby converting the multivalued image to a binary dot pattern.

* * * * *